(12) United States Patent
Dominici et al.

(10) Patent No.: US 9,170,643 B2
(45) Date of Patent: Oct. 27, 2015

(54) DISPLAY SYSTEM CONTAINING AN ADAPTIVE SEMI-TRANSPARENT DISPLAY DEVICE AND MEANS FOR DETECTING THE LANDSCAPE VIEWED BY THE USER

(71) Applicant: Thales, Neuilly sur Seine (FR)

(72) Inventors: Johanna Dominici, Eysines (FR); Sebastien Ellero, Francescas (FR); Loic Becouarn, Pessac (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 14/105,128

(22) Filed: Dec. 12, 2013

(65) Prior Publication Data

US 2014/0160014 A1 Jun. 12, 2014

(30) Foreign Application Priority Data

Dec. 12, 2012 (FR) ..................... 12 03374

(51) Int. Cl.
*G06F 3/00* (2006.01)
*G06F 3/14* (2006.01)
(Continued)

(52) U.S. Cl.
CPC .............. *G06F 3/005* (2013.01); *G02B 27/01* (2013.01); *G06F 3/1438* (2013.01); *G09G 3/002* (2013.01); *G09G 3/003* (2013.01); *G09G 5/00* (2013.01); *G02B 2027/0118* (2013.01);
(Continued)

(58) Field of Classification Search
CPC ............ G02B 27/017; G02B 27/0172; G02B 2027/0132; G02B 2027/0187; G02B 27/0176; G02B 2027/0138; G02B 27/01; G06F 3/005; G06F 3/1438; G09G 3/002; G09G 9/003; G09G 5/00; G09G 2380/12; G09G 2300/023; G09G 2320/0238; G09G 2320/066; G09G 2320/0686; G09G 2340/12; G09G 2340/14; G09G 5/377; G09B 2027/0187
USPC ..................... 345/1.1–1.3, 3.1, 7–8
See application file for complete search history.

(56) References Cited

U.S. PATENT DOCUMENTS 5,382,262 A * 1/1995 Moore .............................. 8/543
5,742,264 A 4/1998 Inagaki et al.
(Continued)

FOREIGN PATENT DOCUMENTS

EP 0 570 037 A1 11/1993

OTHER PUBLICATIONS

French Search Report for French Counterpart Application No. FR 1203374, 8 pgs. (Apr. 9, 2013).

*Primary Examiner* — Md Saiful A Siddiqui
(74) *Attorney, Agent, or Firm* — Blakely, Sokoloff, Taylor & Zafman LLP

(57) ABSTRACT

The general field of the invention is that of display systems comprising an electronic calculator containing first image generation means and an associated semi-transparent display device, said display device intended to be arranged in front of an outside landscape. The display device according to the invention consists of two overlaid semi-transparent flat display screens, a photo-sensitive sensor and a position detection system. The first display screen is passive, its transmission rate being controlled by the first image generation means, the second display screen is active, its light emission being controlled by the first image generation means. The image generated is displayed either on the first display screen, or on the second display screen as a function of the outside landscape luminance information output by the photo-sensitive sensor and the position detection.

6 Claims, 3 Drawing Sheets

(51) Int. Cl.
*G09G 3/00* (2006.01)
*G09G 5/00* (2006.01)
*G02B 27/01* (2006.01)

(52) U.S. Cl.
CPC ............... *G02B 2027/0138* (2013.01); *G02B 2027/0187* (2013.01); *G09G 2300/023* (2013.01); *G09G 2320/0238* (2013.01); *G09G 2320/066* (2013.01); *G09G 2320/0686* (2013.01); *G09G 2340/12* (2013.01); *G09G 2340/14* (2013.01); *G09G 2380/12* (2013.01)

(56) References Cited

U.S. PATENT DOCUMENTS

| | | | |
|---|---|---|---|
| 6,864,927 B1* | 3/2005 | Cathey | 349/11 |
| 2007/0242186 A1 | 10/2007 | Ikeno et al. | |
| 2008/0007486 A1* | 1/2008 | Fujinawa et al. | 345/5 |
| 2008/0192013 A1* | 8/2008 | Barrus et al. | 345/173 |
| 2008/0218434 A1* | 9/2008 | Kelly et al. | 345/8 |
| 2009/0213037 A1* | 8/2009 | Schon | 345/7 |
| 2010/0333006 A1* | 12/2010 | Ostergard et al. | 715/768 |
| 2011/0043435 A1 | 2/2011 | Hebenstreit et al. | |

\* cited by examiner

DISPLAY SYSTEM CONTAINING AN ADAPTIVE SEMI-TRANSPARENT DISPLAY DEVICE AND MEANS FOR DETECTING THE LANDSCAPE VIEWED BY THE USER

BACKGROUND OF THE INVENTION

1. Field of the Invention

The field of the invention is that of display devices arranged in civil and military aircraft cockpits.

2. Description of the Prior Art

Currently, the control panels of modern aircraft cockpits contain display screens and instruments on the greater part of their surface, thereby reducing direct sight of the outside landscape in the lower zone of the cockpit. In a certain number of applications, including flight at low altitude, this absence of direct sight can be a nuisance.

A simple first solution consists in the pilot contorting himself to see above the display screens, when that is possible.

A second solution consists in using collimated "see through" display systems. These systems fall into two main categories, helmet visors carried by the head of the pilot and so-called "Head-Up Display" devices permanently mounted in the cockpit. These devices overlay information in the form of imagery or symbol sets on the outside landscape.

The latter equipment has the particularity of being collimated, i.e. the information output by a displayer is projected "at infinity" by means of suitable optics. Thus, the pilot does not need to focus on the information or on the landscape, the two being seen sharply at the same time. This equipment has a certain technical complexity and therefore a high cost. Moreover, the information is presented in a specific manner in order not to mask the background landscape, which implies a different representation from that of "head-down" screens. The pilot must then put a certain amount of effort into his to-and-fro movements between the "head-up" and "head-down" screens to find his coordinates.

A third solution consists in using semi-transparent display screens placed in the field of vision of the user and which make it possible to project an image overlaid on the outside landscape. One of the difficulties of overlaying is that the luminance from the outside landscape can be highly contrasted and/or very bright. It is, of course, essential that whatever the variations in luminance, the overlaid image remain perfectly legible without excessively dimming the vision of the outside landscape. It is possible to produce emissive screens with high luminance but these display screens remain expensive and consume a large amount of electricity.

SUMMARY OF THE INVENTION

The display system according to the invention does not exhibit these drawbacks. It contains a semi-transparent display device containing two overlaid display screens, the first passive and the second active, and means for detecting the landscape seen by the user so as to determine the best configuration of any screens making it possible to obtain a level of luminance and image contrast well adapted to the outside luminance conditions. More precisely, the subject of the invention is a display system comprising an electric calculator consisting of first image generation means and an associated semi-transparent display device, said display device intended to be arranged in front of an outside landscape, characterized in that the display device consists of two overlaid semi-transparent flat display screens and a photo-sensitive sensor intended to be arranged in front of the same outside landscape, the first display screen being passive, its transmission rate being controlled by the first image generation means as a function of the outside landscape luminance information output by the photo-sensitive sensor, the second display screen being active, its light emission being controlled by the first image generation means, the image generated by the image generation means being displayed either on the first display screen, or on the second display screen as a function of the outside landscape luminance information output by the photo-sensitive sensor.

Advantageously, the display system contains a position detection system intended to be carried by the head of a user, the calculator comprising second means arranged so as to determine the fraction of the outside landscape seen by said user through the semi-transparent display device, the image generated by the image generation means being displayed either on the first display screen, or on the second display screen as a function of the luminance information of said fraction of the outside landscape output by the photo-sensitive sensor.

Advantageously, the photo-sensitive sensor being a camera, the electronic calculator contains third means arranged so that the spatial transmission rate of the first passive display screen depends on the spatial distribution of the luminance levels in the fraction of the outside landscape.

Advantageously, the third means are arranged so as to determine the position of the horizon line in the outside landscape, the spatial transmission rate of the first passive display screen depending on the spatial distribution of the luminance levels above and below said horizon line.

Advantageously, below a first predetermined luminance threshold, the image is displayed on the second display screen and above said first predetermined luminance threshold, the image is displayed on the first display screen in reverse video mode.

Advantageously, above a second predetermined luminance threshold, the first display screen is totally opaque and the image is displayed on the second display screen.

Advantageously, the display device contains a transparent touch-sensitive surface and in that the electronic calculator contains fourth means arranged so that the touch-sensitive surface contains means for controlling the luminance and/or the contrast of the image displayed.

Advantageously, the display system is an aircraft control panel system.

BRIEF DESCRIPTION OF THE DRAWINGS

The invention will be better understood and other advantages will become apparent on reading the following description, in no way limiting and with reference to the appended figures among which.

DETAILED DESCRIPTION

Figure 1:
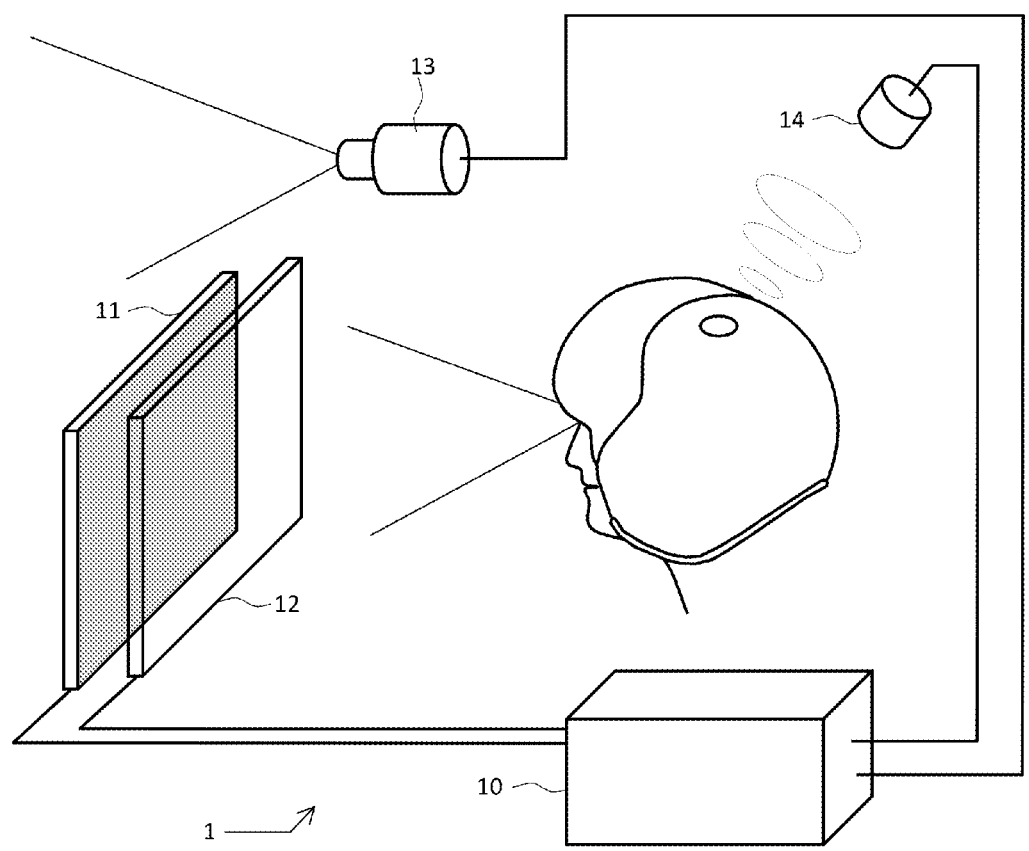
FIG. 1 represents a general view of the display system according to the invention.

By way of non-limiting example, a display system according to the invention is represented in FIG. 1 in an operational configuration. The system represented is a display system 1 of an aircraft control panel. It can be adapted to all types of vehicles requiring that information about piloting, navigation or the vehicle be overlaid on the outside.

It comprises:
- an electronic calculator 10 containing first image and/or symbol generation means and various calculation and control means;
- an associated semi-transparent display device arranged in front of an outside landscape. This device contains two overlaid semi-transparent flat display screens 11 and 12. The term flat screen is understood to mean a screen of small thickness, not exceeding a few millimeters to a few centimeters. A flat screen is not necessarily planar, it can also be slightly curved. In FIG. 1, these screens have been separated for purposes of clarity. The first display screen 11 is passive, its transmission rate is controlled by the first image generation means. By way of example, such a passive or blocking screen can be a liquid crystal or "LCD" screen. It is arranged on the outside landscape side. The second display screen 12 is active, its light emission is controlled by the first image generation means. It is arranged on the user side. By way of example, such an emissive screen may be of OLED (Organic Light Emitting Diode) type. These two screens, transmitting and blocking, can be monochrome or colour;
- a photo-sensitive sensor 13 intended to be arranged in front of the same outside landscape. In the large majority of applications, this photo-sensitive sensor is a camera. This sensor or this camera are arranged so as to obtain a spatial distribution of the luminance of the outside landscape seen through the display device. For on-board aeronautical applications where the brightness variations in the outside landscape are very large, the camera must be highly dynamic;
- detection of the position of the pilot's head 14. Currently various technical principles exist making it possible to produce a head position detection system. Non-limiting examples include electromagnetic systems and optical systems. These various systems generally contain a first element of known fixed position, a second mobile element carried by the user's head and means making it possible to pinpoint the position of the second element in the reference frame of the first element. These systems are well known to those skilled in the art. It should be noted that the display system can optionally operate without this head position detection. The calculations are then made taking into account an average position of the users head. In this case, the slaving of the display screens is less accurate.

The operation of the system is as follows. The camera provides images of the outside landscape seen by the user. Its field is large enough that, whatever the movements of the user's head, his field of vision through the semi-transparent display device is always included in that of the camera. Knowing the position of the user's head by means of the position detection, the calculator determines, in the image provided by the camera, the fraction of the outside landscape perceived by the user. This fraction of image is analyzed by the electronic calculator, which calculates the spatial distribution or the luminance histogram in this portion of the image. The histogram can be calculated over the whole of the image-field or over various zones as a function of the outside scene. A multi-zone treatment makes it possible to avoid the intermittent very bright zones such as those observed in a scene in twilight conditions. By default, the calculator detects only the position of the horizon line in the image.

As a function of the luminance information, the calculator then chooses the display screen on which the image will be displayed and the associated luminance level.

Figure 2:
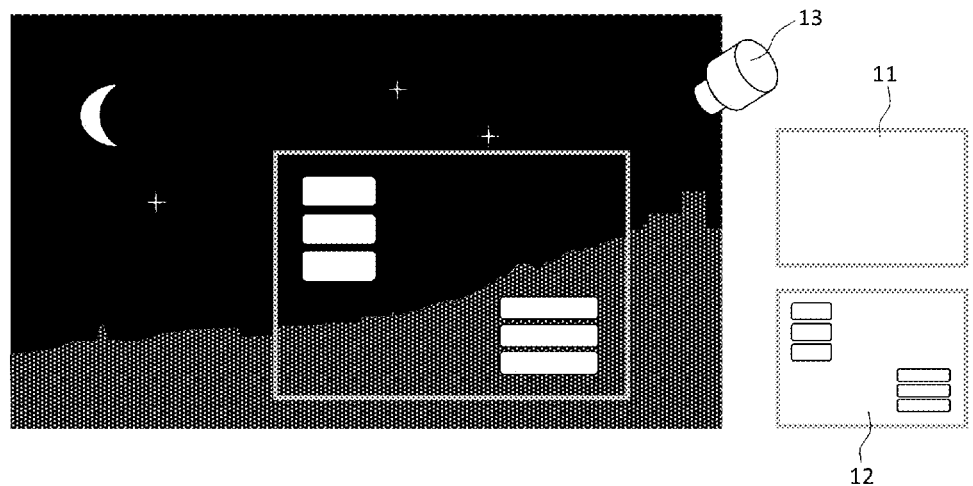
FIG. 2 represents the configuration of the screens according to the invention in night mode with low brightness.

More precisely, when the outside luminance is low, transmission of the outside landscape is prioritized. The first screen is rendered as transparent as possible and the image or the symbols are displayed on the second emissive screen. FIG. 2 illustrates this mode of operation. The main drawing of this figure represents a landscape. The camera 13 is represented above and to the right of this landscape. The grey rectangle represents the limits of the display device. The two screens 11 and 12 on the right-hand side of the main drawing represent the first blocking screen and the second emissive screen. In nocturnal lighting conditions, the first screen is transparent, the images represented by rectangles on this figure and on the following figures are displayed on the emissive screen. The luminance of the symbols depends on the level of outside luminance.

Figure 3:
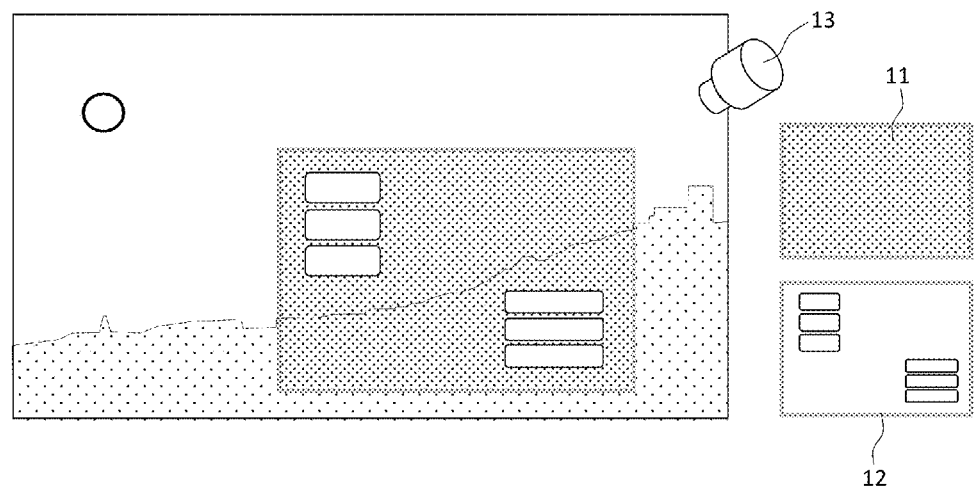
FIG. 3 represents the configuration of the screens according to the invention in day mode with medium brightness.

When the luminance is higher and when the landscape contains zones of contrast, the transmission of the blocking screen is then a function of the luminance of said zones. Such is the case, for example, when a horizon line separates the sky from the earth or from the sea. The image remains displayed on the second emissive screen with a suitably adapted luminance. FIG. 3 illustrates this mode of operation. The main drawing of this figure represents the same landscape as FIG. 2 with the same symbol set. In bright daylight, the first screen 11 is semi-transparent, the images are displayed on the second screen 12 with a good contrast without it being necessary to have excessively high image luminances.

Figure 4:
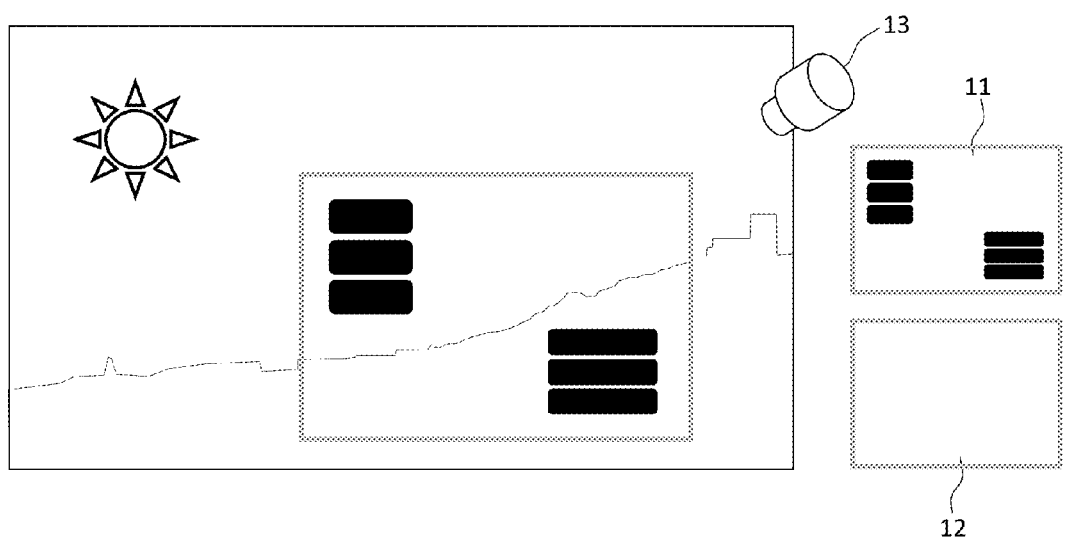
FIG. 4 represents the configuration of the screens according to the invention in day mode with high brightness.

Beyond a certain luminance value, the luminance setpoints of the emissive screen no longer making it possible to guarantee adequate contrast, the image presented on the transparent screen is switched to reverse video mode and displayed by the blocking screen. The emissive screen is then turned off. FIG. 4 illustrates this mode of operation. The main drawing of this figure represents the same landscape as FIGS. 2 and 3 with the same symbol set. In very bright daylight, the first screen is transparent, the images are displayed on the first blocking screen 11 in reverse video mode. The second screen 12 is turned off.

As a last resort and for very high luminances, if the reverse video mode does not suffice, the blocking screen 11 is configured at maximum opacity over its whole surface so as to obtain optimal legibility of the emissive screen. This mode however removes the transparency function of the display screen.

The various luminance thresholds are a function of the application, of the type of carrier and of the performance of the display screens. Their determination does not pose any particular problems for those skilled in the art.

The combination of the two screen technologies allows for a highly dynamic contrast adjustment. For a given contrast value, the pilot no longer needs to contort himself or to orient the aircraft and the maximum luminance of the screen in emissive mode can be reduced compared to a standard emissive transparent screen. The need for a light flux in order to guarantee adequate contrast is greatly reduced. The power consumption of the system is also reduced with respect to standard display systems of the prior art.

Optionally, the screen can become interactive while retaining its transparency by overlaying a transparent touch-sensitive surface on the display screens. Various possible technologies exist for producing a touch-sensitive surface. Examples include:
- optical touch-sensitive technology: a light reflector is installed round the perimeter of the whole screen. A set of optical emitter/receiver pairs is housed in the screen maintenance system. Thus it is possible to detect the interactions of the pilot on this screen;

projected capacitive technology: a capacitive touch-sensitive tablet is bonded onto each emissive tablet or the touch-sensitive detection system is incorporated into the display screen.

so-called "in-cell capacitive" technology: the sensitive sensors are incorporated into the screen, between the light-emitting pixels.

Touch-sensitive technology provides an additional advantage. In the case where the automatic transmission control system is not suitable for a particular mission or scene, the pilot retains the option to switch the servo system into manual mode, and, by way of the touch-sensitive device, to designate the zones whose luminance or contrast he wishes to adjust at his convenience.

What is claimed is:

1. A display system comprising an electronic calculator and an associated semi-transparent display device, said display device intended to be arranged in front of an outside landscape, wherein the display device consists of two overlaid semi-transparent flat display screens and a photo-sensitive sensor intended to be arranged in front of the same outside landscape, a first display screen being passive, its transmission rate being controlled by the electronic calculator as a function of the outside landscape luminance information output by the photo-sensitive sensor, a second display screen being active, its light emission being controlled by the electronic calculator, an image generated by the electronic calculator being displayed on one of the two displays, either on the first display screen or on the second display screen as a function of the outside landscape luminance information output by the photo-sensitive sensor, wherein the display system contains a position detection system intended to be carried by a user head, comprising the electronic calculator to determine a fraction of the outside landscape seen by said user through the semi-transparent display device, the image generated by the electronic calculator being displayed either on the first display screen, or on the second display screen as a function of the luminance information of said fraction of the outside landscape output by the photo-sensitive sensor, and wherein the photo-sensitive sensor being a camera, comprising the electronic calculator arranged so that a spatial transmission rate of said first passive display screen depends on the spatial distribution of the luminance levels in the fraction of the outside landscape.

2. The display system according to claim 1, wherein the electronic calculator is further to determine the position of a horizon line in the outside landscape, the spatial transmission rate of the first passive display screen depending on the spatial distribution of the luminance levels above and below said horizon line.

3. The display system according to claim 1, wherein, below a first predetermined luminance threshold, the image is displayed on the second display screen and above said first predetermined luminance threshold, the image is displayed on the first display screen in reverse video mode.

4. The display system according to claim 1, wherein, above a second predetermined luminance threshold, the first display screen is totally opaque and the image is displayed on the second display screen.

5. The display system according to claim 1, wherein the display device contains a transparent touch-sensitive surface, and wherein the electronic calculator to control the luminance and/or a contrast of the image displayed in response to input from the touch-sensitive surface.

6. The display system according to claim 1, wherein the display system is an aircraft control panel system.

* * * * *